United States Patent [19]
Cunniff

[11] Patent Number: 5,945,992
[45] Date of Patent: Aug. 31, 1999

[54] MULTILEVEL, CLIENT-SERVER, LARGE MODEL TRAVERSER

[75] Inventor: Ross Cunniff, Fort Collins, Colo.

[73] Assignee: Hewlett Packard Company, Palo Alto, Calif.

[21] Appl. No.: 08/654,652

[22] Filed: May 29, 1996

[51] Int. Cl.[6] .................................................. G06F 9/455
[52] U.S. Cl. ........................................................ 345/335
[58] Field of Search .............................. 395/680, 200.34; 345/334, 330, 333, 335

[56] References Cited

U.S. PATENT DOCUMENTS

| | | | |
|---|---|---|---|
| 4,430,526 | 2/1984 | Brown et al. .......................... | 345/175 |
| 5,339,247 | 8/1994 | Kirihara et al. ....................... | 364/468 |
| 5,553,223 | 9/1996 | Greelee et al. ........................ | 345/333 |
| 5,659,691 | 8/1997 | Durward et al. ....................... | 345/329 |

FOREIGN PATENT DOCUMENTS

0700018A2  6/1996  European Pat. Off. ........ G06T 15/00

OTHER PUBLICATIONS

Foley et al., "Computer Graphics", Addison–Wesley, pp. 340–344, 1990.
Asente et al., "X Window System Toolkit—The Complete Programmers Guide and Specification", Digital Press, pp. 48–51, 1990.

*Primary Examiner*—St. John Courtenay, III

[57] ABSTRACT

In a client-server system in which scenes of objects are displayed by a client which receives data from a server, the rendering of the scene is speeded up by eliminating large amounts of data associated with objects which will not be rendered. This is accomplished by storing the object data in a tree hierarchy, and then first pruning those objects which are outside of the view of the observer in several defined steps. After the objects which will not be rendered have been pruned by the server, the data associated with objects which could not be pruned is transferred to the client over a data path, and the client goes through a number of steps to cull objects which will not be viewed. By utilizing the present invention, the display of graphics objects is significantly enhanced without need to use the former brute force methodology.

17 Claims, 6 Drawing Sheets

MULTILEVEL, CLIENT-SERVER, LARGE MODEL TRAVERSER

BACKGROUND OF THE INVENTION

The present invention relates to client server computer systems. In particular, the invention relates to a novel approach to sending data, particularly graphics data from a server to a client system.

As computer systems have gained both acceptance and popularity, ease of use has become an issue. In many respects, so-called "user friendly" interfaces have made a difference in their successful deployment. Users now expect that computers will not be merely text based, but that they will include graphical interfaces, as well as graphical applications.

Heretofore, a limitation which has existed in the successful implementation of graphical systems has been that they have been extremely hardware intensive. In particular, in order to advance the art in computer graphics, the standard approach has been to upgrade the hardware—to gain better resolution, to gain faster screen displays, and to otherwise gain faster and better access to the available data.

Up to a point, this "brute force" approach has actually been needed. For example, a high resolution monitor is required in order to display high resolution graphics, and a fast processor is required in order to be able to update images quickly on the screen. However, a problem which remains is that the brute force approach, itself, has limitations. In particular, it is very expensive to continuously upgrade hardware, and unless all aspects of the hardware can be upgraded, there will be limitations on the overall system benefits simply because system performance will always be limited to the weakest link in the system.

These limitations are particularly true in client-server systems, i.e., those systems in which a server containing large amounts of data, is called upon by a client system to provide the data so that the client can render and image. In such systems, the previous approach of sending all of the available data to the client, and letting the client process the data and create a screen image, is simply too inefficient. This inefficiency is further amplified where the server has large amounts of data available for use in generating three-dimensional ("3-D") images on the client system.

SUMMARY OF THE INVENTION

In accordance with the preferred embodiment of the invention, the problem of transferring large amounts of graphical data, particularly data associated with 3-D graphical images, from a server to a client has been solved.

The invention is an improved multi-level client server, large model traverser of the type which includes a server system and a client system which are connected together by a data path. In accordance with the invention, the present, improved system includes pruning means within the server system for pruning objects which will not be rendered by the client. The pruning means eliminates those objects which will not be rendered by the client from the data which the server will transmit to the client.

The client contains culling means for eliminating the data associated with objects which will not be rendered by the client. Accordingly, object data which is not needed by the client is pruned by the server system prior to sending data over the data path to the client system, and graphics data which will not be part of the scene is culled by the client system prior to being rendered.

An improved method of rendering graphics scenes on a client system served by a server through a data path is also described. The improvement comprises the steps of storing the data in objects on the server. The object data is stored in a hierarchical tree structure in which objects contained by other objects are arranged in such a manner that they can be pruned in accordance with rules associated with where they are in the hierarchy.

In the data structure of the preferred embodiment of the invention, information is stored as to the position of each data object, its bounding geometry, and its opaque radius. Using this information, various objects whose data has been sent to the client can be culled without rendering by determining whether they would be within the view cone of the observer, and by whether they would be obscured by objects in front of them. In addition, based upon their distance from the observer and upon their size, a level of detail based culling operation which would render small, distant objects at lower detail, or invisible, could be provided. The invention also employs steps which determine whether any part to the bounding box which includes all of an object's data crosses the view frustum of the observer.

DETAILED DESCRIPTION OF THE PREFERRED EMBODIMENT OF THE INVENTION

Figure 1:
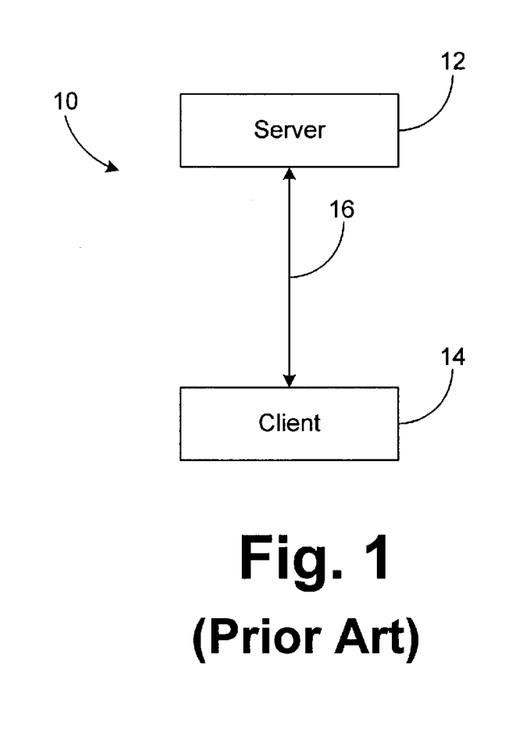
FIG. 1 is a schematic diagram of a typical client-server system of the type referred to herein.

In order to understand the present invention, it is helpful to first review the systems of the prior art. With reference, therefore, to FIG. 1, a typical client server system 10 is illustrated. In the system 10, a server 12, which stores data, is able to send that data to a client 14 which has need for the data over a data path 16. Various problems with this approach result from the amount of data which is stored on the server 12, as compared to the amount of data which may actually be needed by the client 14 in order for the client 14 to be able to provide a desired graphics display to a user.

The problems have generally been solved before by the client 14 requesting data from the server 12, the server 12 transferring data over the data path 16 to the client 14, and then having the client 14 determine which of the data actually was to be displayed by the graphics display of the client 14. As the resolution of graphics displays got better, and as servers were able to store more data, the result was that each time a client 14 needed to produce ("render") an image, the data had to be transferred from the server 12 over the data path 16 to the client 14 which had to select the data to be displayed and then display it. With each advance in resolution, further advances were required to transfer and handle the data. This "brute force" approach continued to place additional requirements on data access rates, data transfer rates, and display hardware and software.

Figure 2:
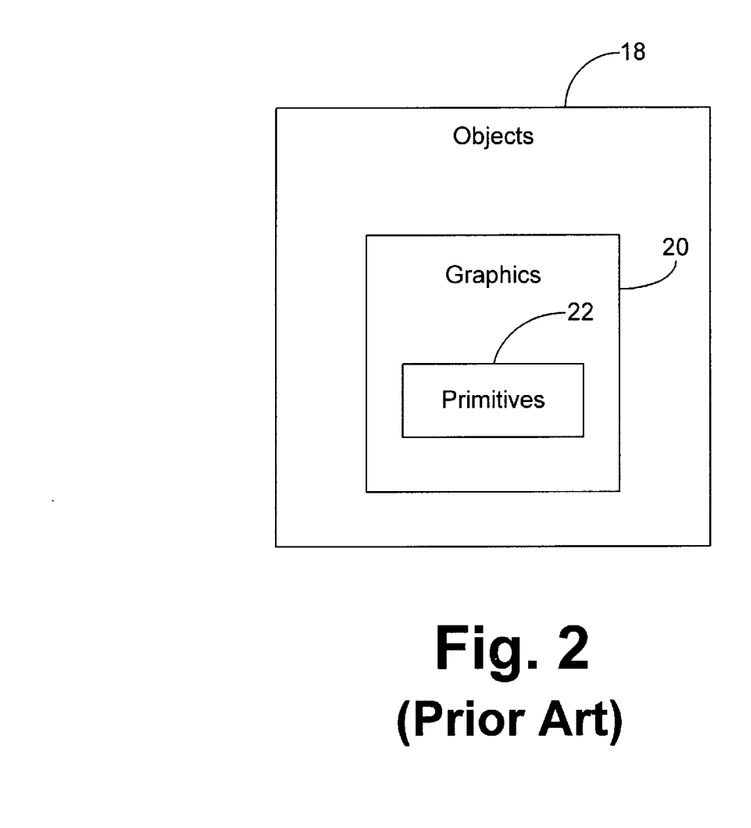
FIG. 2 is an illustration of a hierarchical data organization of the type used in the present invention.

Referring to FIG. 2, in accordance with the present invention, a new approach has been developed in which data is represented and stored on the server 12 in a multi-level hierarchy. In particular, data is referred to as objects 18, which are made up of graphics 20, which are, in turn, made up of primitives 22 (such as lines, triangles, and polygons). Accordingly, in accordance with the present invention, the multiple levels of data representation can be used initially by the server 12 to determine if the data relating to a particular object 18 is even needed by the client 14. If a particular object 18 is not needed to satisfy a particular request of the client 14, then it is not necessary for the server 12 to transfer either the graphics 20 or the primitives 22 associated with that data object 18 to the client 14.

Figure 3:
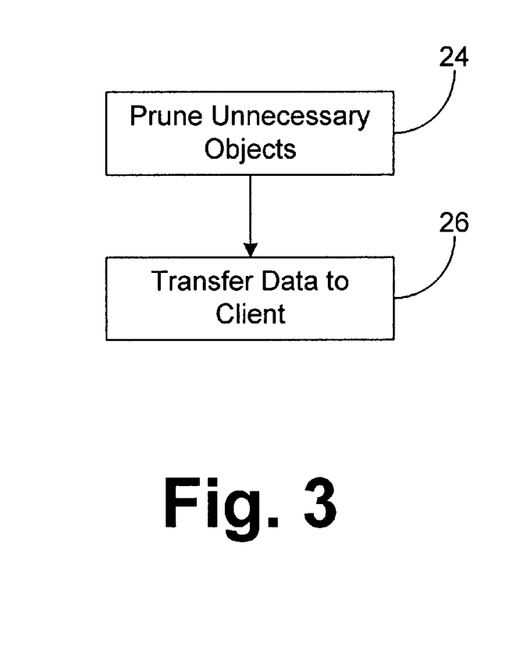
FIG. 3 is an illustration of the steps taken by the server in response to a client's expressed need to display a scene from a particular location looking in a particular direction.

If it is possible for the server 12, to make an initial determination that the client 14 would not have a particular object 18 "in view", then no data transfer (with respect to that object 18) is even necessary. Thus, as illustrated in FIG. 3, the server 12 is responsible for performing two steps, namely removing ("pruning") unnecessary objects 24, and transferring to the client 14 that data which is associated with possibly needed objects 26. The first step of the present invention, therefore, is to eliminate ("prune") objects which the server 12 can determine are not needed by the client 14. This step is carried out by a process involving four steps, as illustrated in FIG. 4.

Figure 4:
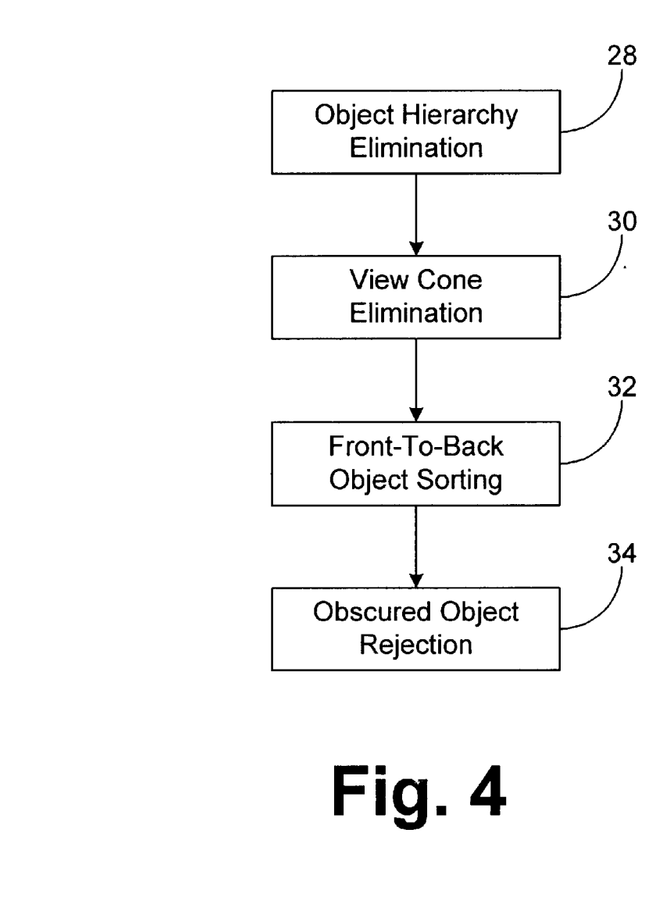
FIG. 4 is an illustration of the steps which the server takes in conducting its pruning operations.

As shown in FIG. 4, the step of pruning unnecessary objects is accomplished by the steps of Object Hierarchy Elimination 28, View Cone Elimination 30, Front-to-Back Object Sorting 32, and the trivial rejection of obscured objects, i.e., the step of Obscured Object Rejection 34. These steps, which all occur at the server 12, will be explained in greater detail hereinafter. However, as will be understood by those skilled in the art, such pruning of object data significantly reduces the amount of data which must be transferred to the client 14, thereby significantly reducing the time required by the client 14 to render a scene. Notwithstanding these benefits, there is no need for higher speed hardware by the client 14. Thus, the "brute force" approach of the prior art is eliminated.

The step of Object Hierarchy Elimination 28 (of FIG. 4) can now be explained as follows. In accordance with the invention, at a high level of data abstraction, an Object is considered to be a container for other Objects. In particular, an Object may be contained by one other Object (its "Parent"), and it may contain other Objects (its "Children"). Each Object can also have "Siblings" (corresponding to the other Children of that Object's Parent). Accordingly, using this abstraction, an Object can be considered to have the following data structure:

```
StructObject{
    Struct Object
        *Parent;         /*what contains this object */
        *Children;       /*what this object contains */
        *Prev, *Next;    /*linked list of siblings */
    Float
        Pos[3];          /*position in space */
        Radius;          /*bounding sphere of all of graphics */
        OpaqueRad;       /*opaque radius - hides objects. behind */
        /* other information including graphics */
};
```

In accordance with the foregoing data structure, an Object is considered to have a pointer to its Parent (*Parent), and it may have a pointer to one of its Children (*Children). As each Object in the preferred embodiment of the data structure has pointers forming a linked list, to its Siblings (*Prev and *Next), it is always possible for an Object to find all of its Children, even though it has only a single pointer to one of its Children.

The data structure also indicates that each Object knows where it is in 3-D space (Pos[3]), and that it knows both the bounding sphere containing all of its graphics data (Radius) and the radius which it has and which obscures all Objects which are behind the Object (its opaque radius, called "OpaqueRad").

Figure 5:
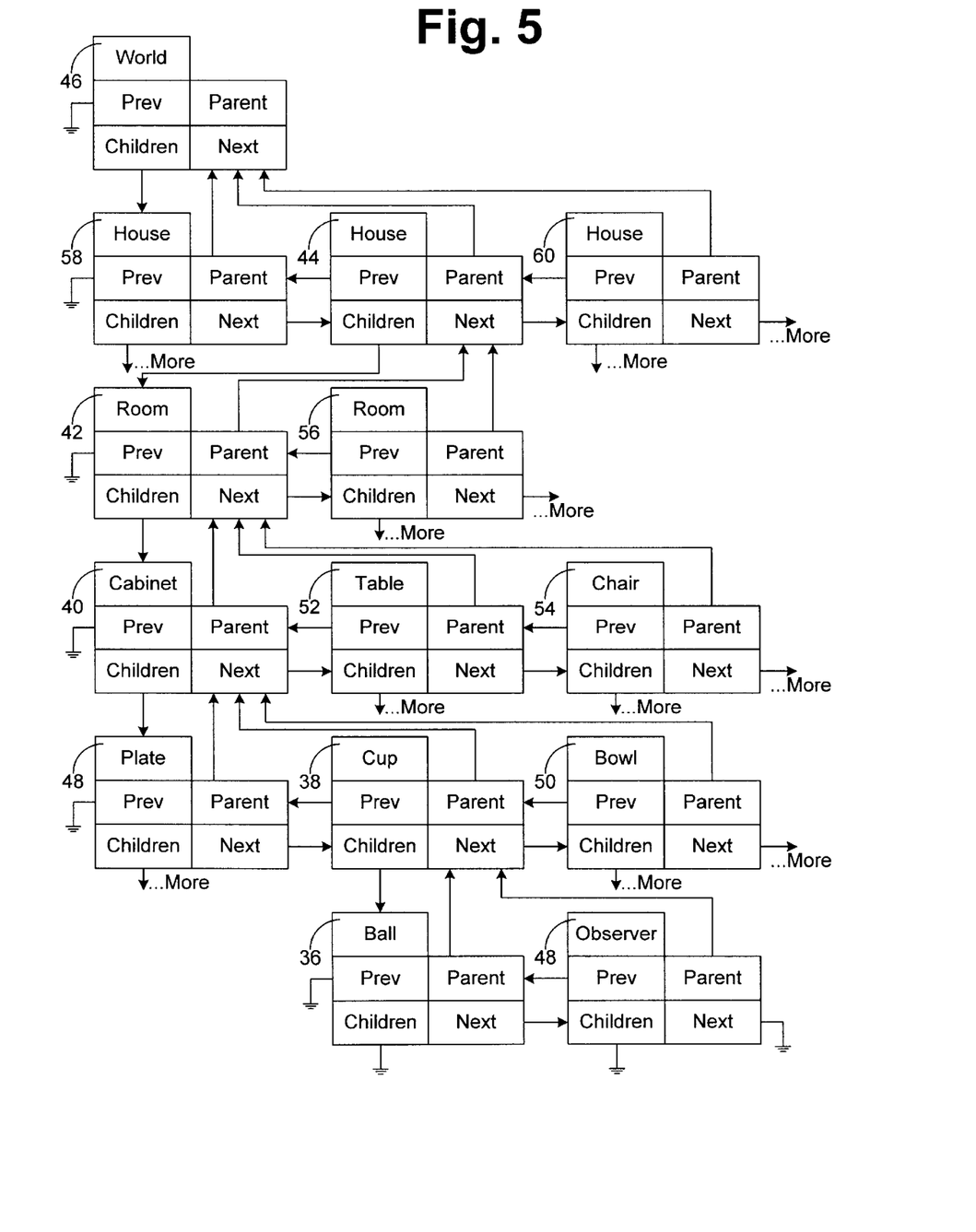
FIG. 5 is an illustration of the tree-based data structure used by the present invention.

With reference now to FIG. 5, a tree structure implementing the data structure of the present invention is illustrated. By way of example, a graphical object, namely a ball 36, is contained in a cup 38, which is contained in a cabinet 40, which is contained in a room 42, which contained is in a house 44.

The cup 38 has a plate 48 and a bowl 50 as its siblings. Similarly, the cabinet 40 (containing the cup 38) has a table 52 and a chair 54 as its siblings; the room 42 (containing the cabinet 40) has a room 56 as its sibling; and the house 44 (containing the room 42) has houses 58, 60 as its siblings. As illustrated, the houses 44, 58, 60, are all contained in the world 46 (the world 46 being the Object which contains all of the other Objects). While a number of objects are illustrated in FIG. 5, many more could be part of the data on the server 12, as indicated symbolically by the various " . . . more" indicia.

In accordance with the preferred embodiment of the present invention, whenever a client 14 indicates to a server 12 that the client 14 wants to render a scene, the server 12 must provide data to the client 14 which the client 14 needs to render the scene based upon the location of an observer who is looking in a particular direction from a particular point. Accordingly, the present invention assumes that there is an observer 48 who is in the location of the object (the ball 36) which is being viewed.

A textual representation of the tree hierarchy illustrated in FIG. 5 is:

```
World {
    House {
        ... more
    }
    House {
        Room {
            Cabinet {
                Plate { }
                Cup {
                    Ball { }
                    Observer { }
```

```
            }
          Bowl {
            ... more
          }
          ... more
        }
        Table {
          ... more
        }
        Chair {
          ... more
        }
        ... more
      }
      Room {
        ... more
      }
      ... more
    House {
      ... more
    }
    ... more
}
```

In accordance with the present invention, an observer, such as Observer 48, can see only certain Objects. Consequently, those Objects which the Observer 48 cannot see can be pruned from the data structure (as illustrated at reference 24, FIG. 3). Objects which cannot be pruned, i.e., those which may be visible, are all of its siblings "across", i.e., the ball 36; the children of its siblings "down", of which there are none in FIG. 5; its parent, the cup 38, and its parent's siblings, the plate 48 and the bowl 50; its grandparent, the cabinet 40, and its grandparent's siblings, the table 52 and the chair 54; etc., all the way up to the root of the tree.

In pseudocode:

```
/* Draw siblings and children of siblings */
for(Obj = Observer->Parent->Children; Obj; Obj = Obj->Next) {
    for( Child = Obj->Children; Child; Child = Child->Next) {
        DrawObject( Child );
    }
    DrawObject( Obj );
}
/* Draw parents and siblings of parents */
for( Parent = Observer->Parent; Parent; Parent = Parent->Parent) {
    if( Parent->Parent ) {
        for( Obj = Parent->Parent->Children; Obj; Obj = Obj->Next) {
            DrawObject( Obj );
        }
    }
}
```

The foregoing algorithm works well for pruning several kinds of scenes, including standard city-house-room scenes and scenes involving space, i.e., the solar system-planet-moons-satellite system. Using the foregoing algorithm one can prune all unseen objects based simply upon their hierarchy in the tree structure. Accordingly, the foregoing procedure is referred to herein as Object Hierarchy Elimination (step 28 in FIG. 4), and it constitutes the first pruning step performed by the server 12.

Following Object Hierarchy Elimination, the next step in the present invention is called View Cone Elimination (step 30 in FIG. 4). View Cone Elimination, which is the second level of pruning performed by the server 12, involves the trivial rejection of objects which are outside of the view cone of the Observer 48.

As used herein, the term "view cone" is defined by the position of the observer, a view axis, and a field of view ("FOV"). Thus, the definition of the FOV data structure is

```
Struct FOV {
    float Pos[3];
    float Axis[3];
    float FOV;
}
```

Figure 6:
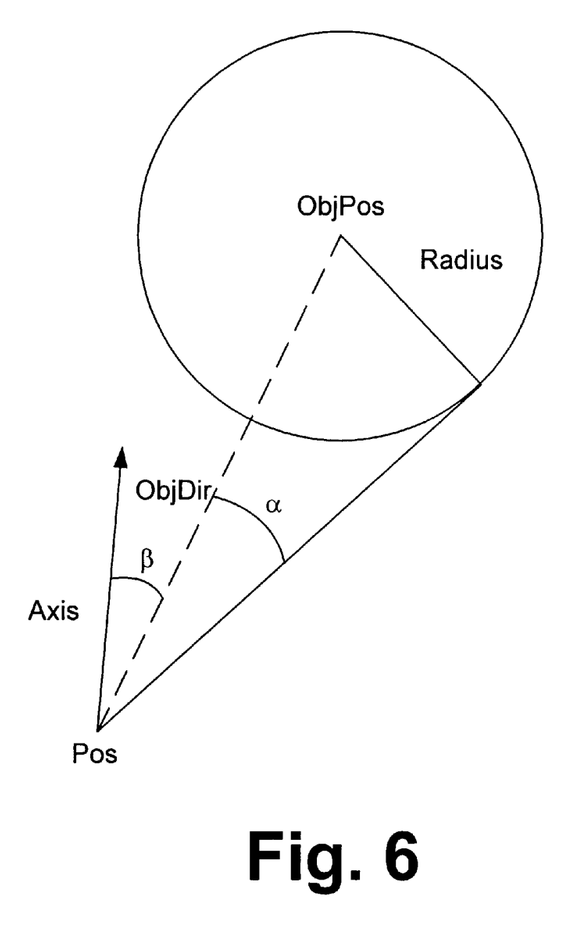
FIGS. 6 and 7 are illustrations of the viewing geometry used in the View Cone Elimination step.

As shown above, an object being considered for trivial rejection has a Position (in 3-D space), and it has a Radius (inside which all of its graphics fit) which are defined as part of its data:

float ObjPos [3];

float Radius;

Referring to FIG. 6, an illustration of the viewing geometry is shown. In the illustration, the vector ObjDir is computed as the vector difference between the Object's Position, ObjPos, and the Observer's Position, Pos, so:

ObjDir=ObjPos–Obj

Figure 7:
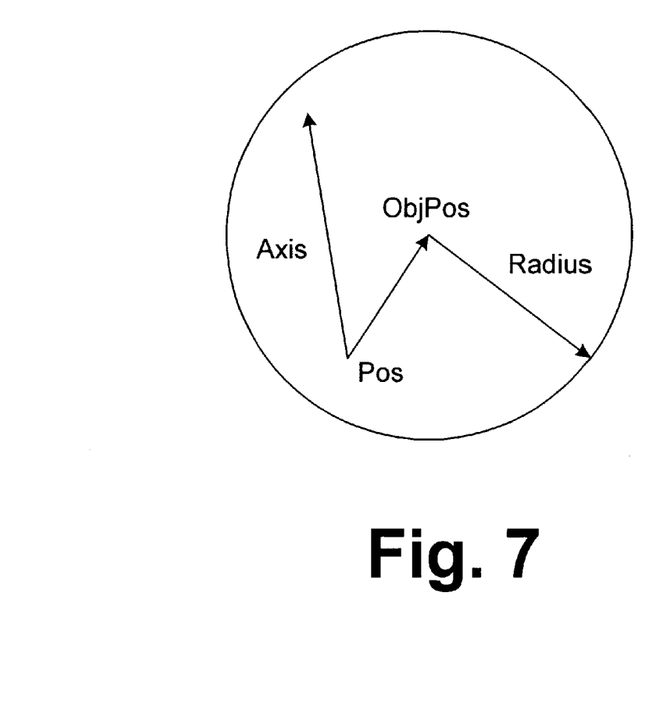

If the length of the vector ObjDir is less than the radius of the Object, i.e., Radius, then trivial rejection is not possible, since the Observer's location, Pos, is inside the Object, as shown in FIG. 7. Otherwise, trivial rejection may be possible as explained below.

In FIG. 6, the angle $\alpha$ (corresponding to the angular half-size of object, as viewed by the observer) and the angle $\beta$ (corresponding to the angular separation of object from the observer's viewing axis) may be computed as follows:

ObjDir is unitized.

$\alpha$=asin( Radius/ObjDist)

$\beta$=acos(VDOT(Axis, ObjDir))

where, ObjDist is the length of the original ObjPos–Pos vector; ObjDir is the ObjPos–Pos vector normalized (to a length of 1); and VDOT is a function which computes the vector dot product of the vectors contained within the parenthesis.

Given $\alpha$, $\beta$, and FOV, we can then trivially reject an object if:

($\beta$–$\alpha$)>=(FOV/2)

Figure 8:
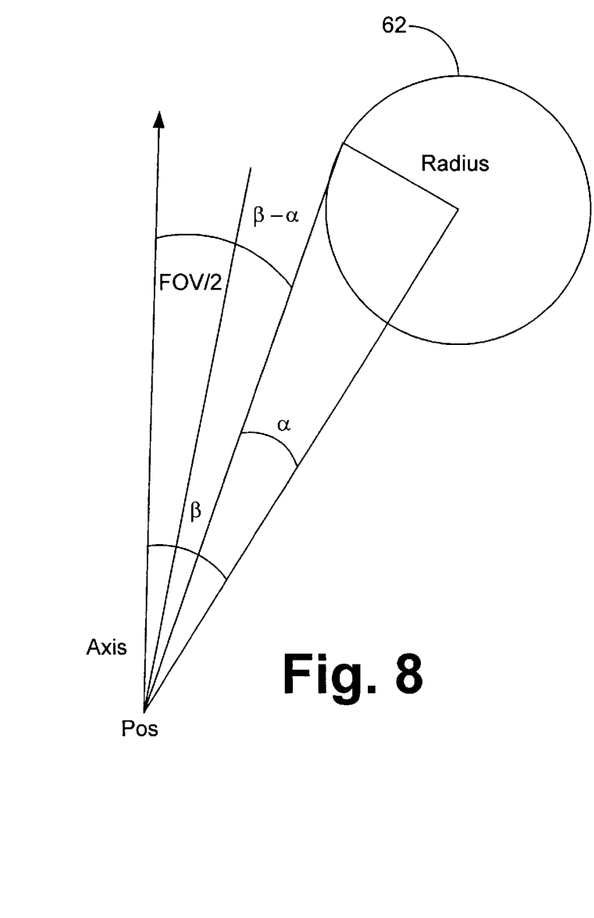
FIG. 8 is an illustration showing how an object can be within (or outside of) the Field of View of another object.

As shown in FIG. 8, the Object 62 is outside of the field of view (FOV) of the observer, so it can be trivially rejected based upon the View Cone Elimination step (reference 30 in FIG. 4).

Following View Cone Elimination, Front-to-Back Object Sorting (reference 32 in FIG. 4) is conducted. In order to accomplish Front-to-Back Object Sorting, all objects which have not been rejected are placed into a list which is sorted based upon its distance from the Observer. The sorted list is traversed from front-to-back (closest to furthest from the Observer), with the remaining objects being sent to the Client 14 for rendering, unless they fail the Obscured Object Rejection test described below.

The Obscured Object Rejection test is conducted as follows. In addition to position and radius information, each object's data includes an "opaque radius" number. An object's opaque radius is the radius inside of which the object is completely opaque. As the sorted list is traversed, rendered objects are placed into another data structure designed for fast searches. An example of one such data structure is called a "quadtree" in the view plane. Each new object is compared against the objects which have already been selected to be rendered. The object is then retained for rendering unless an object which has already been rendered (or selected for rendering) obscures it (i.e., It is fully behind a "closer" object which fully obscures it.).

Figure 9:
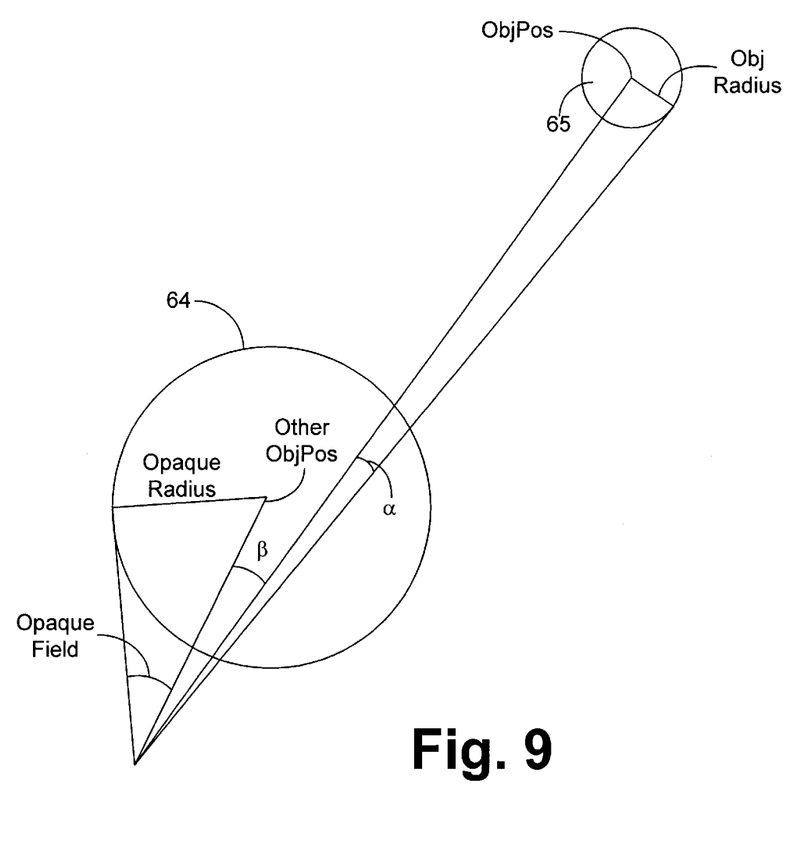
FIG. 9 is an illustration showing how an object can be obscured by a closer object.

Obscuring is based upon the "opaque radius" of the objects, thus with reference to FIG. 9, the Opaque Field of Object 64 is calculated as follows:

OpaqueDir=Other->Pos-EyePos;

OpaqueDist=VLEN(OpaqueDir);

VNORM(OpaqueDir);

OpaqueField=asin(OpaqueRad/OpaqueDist);

ObjDir=Obj->Pos-EyePos;

ObjDist=VLEN(ObjDir);

VNORM(ObjDir);

α=asin( ObjRadius/ObjDist);

β=acos(VDOT(ObjDir, OpaqueDir));

Thus, Obj is completely obscured by Other if, and only if:

(α+β)<=OpaqueField;

With reference to FIG. 9, Object 65 is completely behind, and obscured by, Object 64, so Object 65 can be culled. The traversal of the sorted list can be expressed in pseudocode as follows:

```
for(i = 0; i < NumObjs; i++){
    Obj = SortedObjs[i];
    ObjDir = Obj->Pos - EyePos;
    ObjDist = VLEN( ObjDir );
    VNORM( ObjDr );
    alpha = asin( Obj->Radius / ObjDist );
    Rejected = FALSE;
    for(Other = FIRST_POSSIBLE_OBSCURER( ObjDir );
        Other;
        Other = NEXT_POSSIBLE_OBSCURER( Other )) {
            OtherDir = Other->Pos - EyePos; /* line a */
            OtherDist = VLEN( OtherDir ); /* line b */
            VNORM( OtherDir ); /* line c */
            OpaqueField = asin( OtherDist / Other->OpaqueRadius );
                /* line d */
            beta = acos( VDOT( ObjDir, OtherDir) );
            if( (alpha + beta) <= OpaqueField ) {
                Rejected = TRUE;
                break; /*From obscure-loop*/
            }
    }
    if (?Rejected){
        SendObjToClient( Obj );
        AddObjToQuadtree( Obj );
    }
}
```

Note that lines a, b, c, and d can be precomputed in AddObjToQuadtree. Additionally, FIRST_POSSIBLE_OBSCURER (Vec) uses the quadtree to find the first in the quadrant that Vec crosses.

NEXT_POSSIBLE_OBSCURER returns the next one in that quadrant. Finally, a heuristic can be used to reduce the number of objects in the quadtree. Thus, only objects having at least a certain opaque field or larger need to be stored.

Figure 10:
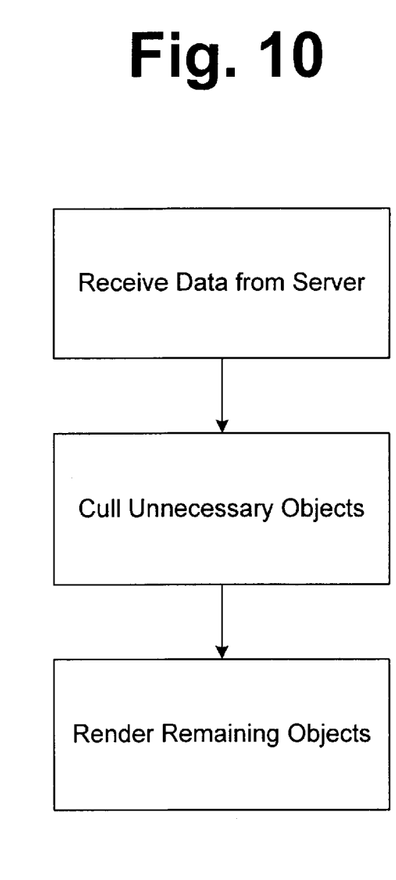
FIG. 10 is a flow chart showing the culling steps performed by the client.

In accordance with the present invention, no further processing occurs at the server 12. That means that this is where the data relating to the remaining objects whose rendering could not be eliminated by the foregoing pruning procedures is sent over the data path 16 to the Client 14, where the data will either be culled or rendered, as illustrated in FIG. 10. In other words, this is where the network transport layer occurs, i.e., where data is actually passed to the client 14 over the data path 16 (See FIG. 1).

In the preferred embodiment of the invention, Objects are each comprised of several graphics which are identified by unique 24-bit IDs, which are sent to the Client 14, along with a 4×3 transform matrix per graphic. In accordance with the invention, the client 14 takes this matrix and graphic ID and renders the requested ID based on further culling checks.

The first culling check, which is conducted by the client 14 is called Level-of-Detail Culling. In order to accomplish Level-of-Detail Culling, the client 14 associates each graphic with a 3-D bounding volume. That 3-D bounding volume is transformed by the matrix supplied to the client 14 by the server 12, and its computed on-screen size is used to compute a Level-Of-Detail ("LOD") bit. For example, four LOD bits, called LOD_TINY, LOD_SMALL, LOD_MEDIUM, and LOD_LARGE, respectively, are preferably computed. After the appropriate bit is computed, if a particular graphic has that bit set, then it is rendered. Otherwise, it is not rendered. Since Graphic IDs may indicate a group of associated Graphic IDs, large numbers of primitives can be culled using only one check.

Level-of-Detail Culling can be controlled in two ways in accordance with the preferred embodiment of the present invention. First, the designer of objects and graphics can tag the graphics with flags indicating whether the graphic is to be displayed when it is tiny, small, medium, or large on screen. The rendering client 14 will then select the appropriate graphic given the pixel area of the bounding box on-screen.

The second way of controlling Level-of-Detail Culling is more automatic in that the graphic designer designs the graphics at a high resolution, and the client 14 automatically creates the other three versions of the graphic based upon reductions in resolution. For example, a sphere may be designed to be tesselated into a rather high number of rows and columns for the high-resolution graphic (e.g., 64 by 32). The client 14 will then automatically create a 32 by 16 graphic, a 16 by 8 graphic, and an 8 by 4 graphic version of the sphere to use as the medium, small, and tiny versions, respectively. This works with all the graphics types supported by the client 14, including (but not limited to), spheres, torii (doughnuts), cones, cylinders, rings and disks, convex polygons, triangle meshes, quadrilateral meshes, altitude meshes, surfaces of revolution, and extrusions.

The exact on-screen pixel areas which cause the various levels-of-detail to be selected are turnable, and they are subject to experimentation. The manner in which the level of detail is selected and rendered is illustrated by the following pseudocode:

```
/* SelectLOD - returns the appropriate flag LOD_TINY,
LOD_SMALL,
 * LOD_MEDIUM, or LOD_LARGE based on the on-screen area of
 * the given bounding box (BBox) transformed by the modelling
 * matrix Mat
 */
int SelectLOD( float BBox[6], float Mat[4][4] )
{
    float
        Verts[8*3];
    int
```

-continued

```
            i;
    float
            x, y, Area,
            XMin, YMin,
            XMax, YMax;
    /* Convert bounding box to 8 vertices on box */
    Verts[0] = BBox[0]; Verts[1] = BBox[1]; Verts[2] = BBox[2];
    Verts[4] = BBox[0]; Verts[5] = BBox[1]; Verts[6] = BBox[5];
    Verts[7] = BBox[0]; Verts[8] = BBox[4]; Verts[9] = BBox[2];
    Verts[10] = BBox[0]; Verts[11] = BBox[4]; Verts[12] = BBox[5];
    Verts[13] = BBox[3]; Verts[14] = BBox[1]; Verts[15] = BBox[2];
    Verts[16] = BBox[3]; Verts[17] = BBox[1]; Verts[18] = BBox[5];
    Verts[19] = BBox[3]; Verts[20] = BBox[4]; Verts[21] = BBox[2];
    Verts[22] = BBox[3]; Verts[23] = BBox[4]; Verts[24] = BBox[5];
    /* Transform bounding box into world coordinates */
    /* Words-per-vertex is 3, # of vertices is 8 */
    TransformPoints( Verts, 3, 8, Mat );
    /* Find on-screen bounding rectangle of bounding box */
    WorldToScreen( Verts[0], Verts[1], Verts[2], &XMin, &YMin );
    XMax = XMin; YMax = YMin;
    for(i = 1; i < 8; i++) {
        WorldToScreen( Verts[3*i], Verts[3*i+1], Verts[3*i+2], &x,
&y);
        if(x < XMin ) XMin = x; if(x > XMax) XMax = x;
        if(y < YMin ) YMin = y; if(y > YMax) YMax = y;
    }
    Area = (XMax - XMin) * (YMax - YMin);
    if( Area < TinyArea)    return LOD_TINY;
    else if( Area < SmallArea)    return LOD_SMALL;
    else if( Area < MediumArea ) return LOD_MEDIUM;
    else            return LOD_LARGE;
}
/* Render a graphic to the screen. */
/* Note that graphics have, among other things,
 * the following fields:
 *    struct Graphic {
 *            float BBox[6];
 *            int LodBits;
 *            PrimitiveList LargeVersion;
 *            PrimitiveList MediumVersion;
 *            PrimitiveList Smallversion;
 *            PrimitiveList TinyVersion;
 *    };
 *
 * where a PrimitiveList is, for example, an OpenGL
 * or Starbase display list.
 */
void DisplayGraphic( struct Graphic *Gfx, float Mat[4][4])
{
    int
            ActualLOD;
    /* Figure out what resolution to draw */
    ActualLOD SelectLOD = SelectLOD( Gfx->BBox, Mat );
    /* See if we can draw this one... */
    if( Gfx->LodBits & LOD_AUTOMATIC) {
        /* This graphic has automatically generated LODs */
        switch( ActualLOD ) {
        case LOD_TINY:
            RenderGraphic( Gfx->TinyVersion );
            break;
        caseLOD_SMALL:
            RenderGraphic( Gfx->SmallVersion );
            break;
        case LOD_MEDIUM:
            RenderGraphic( Gfx->MediumVersion );
            break;
        case LOD_LARGE:
            RenderGraphic( Gfx->LargeVersion );
            break;
        }
    }
    else if( Gfx->LodBits & ActualLOD) {
        /* This graphic is to be displayed at the computed
        * level-of-detail
        RenderGraphic( Gfx->LargeVersion );
    }
}
```

Figure 11:
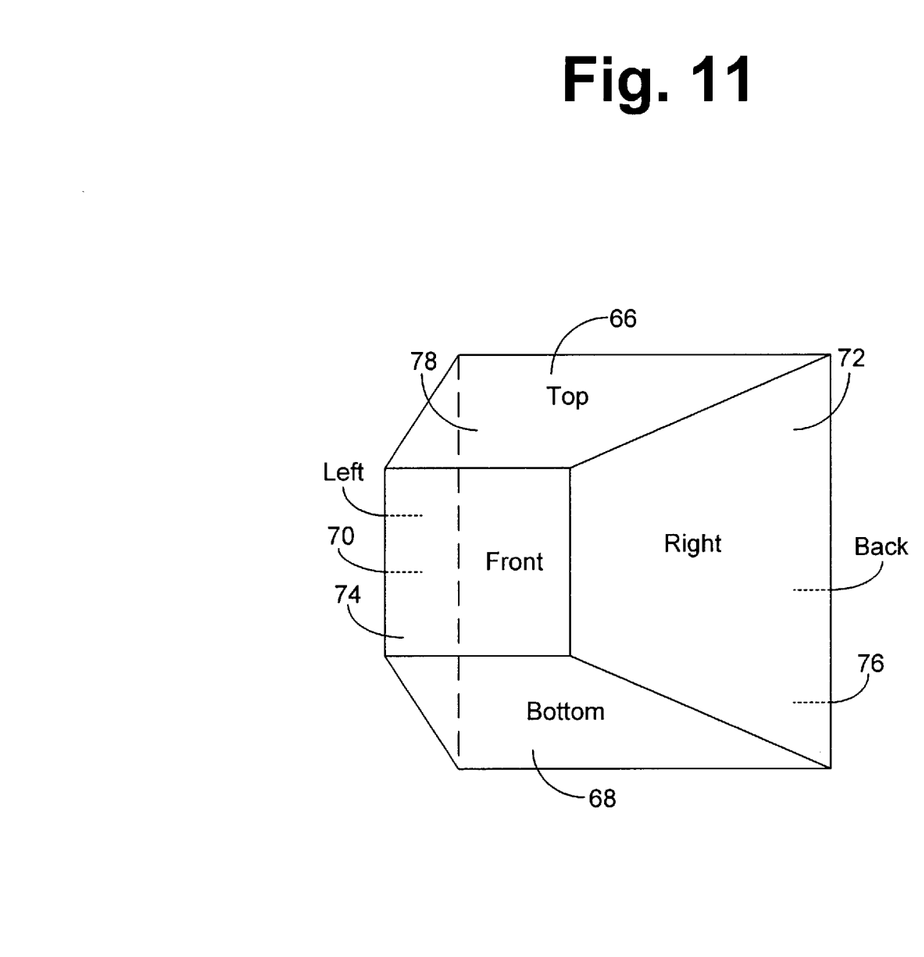
FIG. 11 is an illustration showing how a volume bounding an object is used to determine whether the object will be visible to an observer based upon whether or not any part of the bounding volume is within the frustum which is visible to the observer.

Referring to FIG. 11, the next step, also conducted by the client 14, is called Bounding. In Bounding, there is a volume based trivial reject of graphics. In order to accomplish Bounding, the transformed bounding volume used in Level-of-Detail Culling is reused here. As illustrated in FIG. 11, the view frustum 66 is bound by six planes, a bottom 68, a left side 70, a right side 72, a front 74, and a back 76, and a top side 78.

The sides of the transformed view volume 80 are defined by eight vertices 82, 84, 86, 88, 90, 92, 94, 96, as shown. If each of the vertices 82, 84, 86, 88, 90, 92, 94, 96 of the transformed view volume 80 lie outside any of the six bounding planes 68, 70, 72, 74, 76, 78 of the view frustum 66, then the graphic is culled. In determining whether any of the vertices 82, 84, 86, 88, 90, 92, 94, 96, lies within the view frustum 66, each of the planes 68, 70, 72, 74, 76, 78 of the view frustum 66 is considered in turn. Again, the grouping construct can eliminate large numbers of primitives with a single check.

In considering the transformed view volume 80, shown in FIG. 11, it can readily be determined that all eight of its vertices lie to the right of the right side 72 of the view frustum 66. Therefore, the graphic defined within the view volume 80 is not visible, so it is culled.

At this point, the remaining (unpruned and unculled) graphics are converted to primitives, and they are rendered by the client 14. In the preferred embodiment of the invention, the graphics are preferably rendered through a graphics API, such as Hewlett-Packard's Starbase or OpenGL. The graphics API performs the final two levels of pruning/culling—namely, backface culling and view clipping. As these later two levels are part of the graphics API, those skilled in the art will recognize how they operate.

As will be recognized by those skilled in the art, the order of the Level-of Detail Culling and Bounding steps may be swapped without affecting greatly the performance of the present inventive method.

As will be recognized by those skilled in the art, alternative methods for View-Cone Elimination and Obscured Object Rejection can be used. Thus, while a method for using spheres to do View Cone Elimination and Obscured Object Rejection was described, any convex polyhedron could also be used without departing from the current invention. Thus, by way of example, using a bounding box.

```
struct Object {
    float BBox[6];            /* XYZ minimax ofobject Gtx */
    float OpaqueBBox[6];      /* XYZ minimax of opaque area */
    float XformedBox[8*3];    /* 8 transformed vertices of object */
    float XformedOpaque[8*3]; /* 8 " " of opaque bbox */
    /* More stuff object hierarchy, etc. */
};
    /* The XformedBox and XformedOpaque arrays are created
    * exactly like the BBox-to-verts calculation in SelectLOD,
    * above.
    */
```

As illustrated, View Cone Elimination becomes View Frustum Elimination. Again, just like for graphics (on the client side), the transformed vertices of the bounding box are used to determine whether they all lie on the outside of one of the six planes of the view frustum. This is easily done with a simple plane test, as is well known to those skilled in the computer graphics art.

In order to perform Obscured Object Rejection, in pseudocode, one can perform the following procedure:

```
for( i = 0; i < NumObjs; i++ ) {
    Obj = SortedObjs[i];
    ObjDir = Obj->Pos - EyePos;
    Rejected = FALSE;
```

```
    for( Other = FIRST_POSSIBLE_OBSCURER(ObjDir);
         Other;
         Other = NEXT_POSSIBLE_OBSCURER(ObjDir)
    )
    {
       AllObscured = TRUE;
       for( n = 0; AllObscured && (n < 8); n++ ) {
          To[0]= Obj->XformedBox[3*n];
          To[1]= Obj->XformedBox[3*n+1];
          To[2]= Obj->XformedBox[3*n+2];
          if( NOT RayBoxIntersect( Eye, To,
                 Other->XformedOpaque ) )
          {
             AllObscured = FALSE;
          }
       }
       if( AllObscured) {
          Rejected = TRUE;
          break;      /* From obscure-loop */
       }
    }
    if( !Rejected) {
       SendObjToClient( Obj );
       AddObjToQuadtree( Obj );
    }
  }
}
```

As described above, the opaque area and the bounding volume can be an arbitrary convex polyhedron. In the general case this is accomplished by substituting the number of vertices for "8" in the inner loop, and substituting a RayPolyhedronIntersect call for RayBoxintersect. Of course, with sufficiently complex polyhedra, more time then needed could be used by the server 12 doing obscuration testing. Accordingly, in practice, a bounding box is efficient and sufficient.

I claim:

1. An improved multi-level client server, large model traverser of the type comprising a server system, a client system, and a data path connecting said server system to said client system, wherein the improvement comprises:

(a) pruning means within said server system for pruning objects which are not rendered by the client, said pruning means eliminating said objects from the set of objects which will be transmitted by said server system to said client system, said set of objects selected in response to data transmitted from said client system to said server system;

(b) means for storing objects at said server system and for storing indicators at said server system, said indicators indicating whether one of said objects may be visible when another one of said objects is visible, wherein said pruning means eliminates said one of said objects based on said indicators;

(c) culling means within said client system for eliminating the data associated with objects which will not be viewed prior to the server sending data to the client over said data path, whereby data which is not needed by said client can be pruned by said server system prior to sending data over said data path to said client system, and data which will not be part of the scene can be culled by said client system prior to being rendered.

2. An improved multi-level client server, large model traverser of the type comprising a server system, a client system, and a data path connecting said server system to said client system, wherein the improvement comprises:

(a) pruning means within said server system for pruning objects which are not rendered by the client, said pruning means eliminating said objects from the set of objects which will be transmitted by said server system to said client system, wherein said pruning means within said server system includes:

(1) means for performing Object Hierarchy Elimination;
(2) means for performing View Cone Elimination;
(3) means for performing front-to-back object sorting; and
(4) means for performing Obscured Object Rejection;

culling means within said client system for eliminating the data associated with objects which will not be viewed prior to the server sending data to the client over said data path, whereby data which is not needed by said client can be pruned by said server system prior to sending data over said data path to said client system, and data which will not be part of the scene can be culled by said client system prior to being rendered.

3. The improved multi-level client server, large model traverser of claim 2 wherein said means for performing Object Hierarchy Elimination comprises a hierarchical data structure containing object data arranged as a hierarchy of objects, wherein said hierarchy defines the relationship between a first object and a second object based upon whether said first object contains or is contained by a second object.

4. The improved multi-level client server, large model traverser of claim 2 wherein said means for performing View Cone Elimination comprises means for determining whether a graphics object having a defined radius and position in space is within the field of view of an observer looking in a particular direction with a defined viewing angle.

5. The improved multi-level client server, large model traverser of claim 2 wherein said means for performing front-to-back object sorting comprises means for determining the relative distances from an observer of other graphics objects.

6. The improved multi-level client server, large model traverser of claim 2 wherein said means for performing Obscured Object Rejection comprises means for determining whether a first graphics object having a defined radius and position in space is obscured by a closer graphics object to an observer, wherein said closer graphics object has a defined opaque radius and position, and said first graphics object has a defined radius and position.

7. The improved multi-level client server, large model traverser of claim 3 wherein said hierarchy defines the relationship between said first object and said second object based upon whether said first object and said second object are contained by a third object.

8. The improved multi-level client server, large model traverser of claim 3 wherein said hierarchy defines the relationship between said first object and said second object based upon whether said first object is contained by a fourth object which also contains a second object.

9. An improved method of rendering graphics scenes on a client system served by a server through a data path, the improvement comprising the steps of:

(a) storing the data as a hierarchy of objects on said server, said object data being stored in a hierarchy being in the form of a tree structure in which objects contained by other objects are at different levels of said tree structure, each object being able to point to any parent object in which said object is contained, to any child object which said object contains, and to all sibling objects which are contained by the same parent object;

(b) pruning objects from said tree structure if they are not contained by said object or if they are not contained by the same parental objects which contain said object, where a parental object is either a parent of said object, a sibling of a parent of said object or a parental object of a parental object;

(c) pruning from objects which have not been pruned, those objects which are outside of the field of view of the observer;

(d) sorting those objects which have not been pruned, and pruning from said sorted objects those objects which would be obscured by objects closer to the observer;

(e) transmitting data which has not been pruned over said data path to said client;

(f) culling from said transmitted data those objects which have minimal detail;

(g) culling from the remaining data those objects whose bounding volume is outside of the view frustum of the observer;

(h) culling from the remaining data those objects which can be eliminated by the graphics API; and (i) rendering the remaining objects.

10. The method of claim 9 further comprising the steps of:

(a) performing Object Hierarchy Elimination;

(b) performing View Cone Elimination;

(c) performing front-to-back object sorting; and (d) performing Obscured Object Rejection.

11. The method of claim 10, further comprising the step of determining whether a graphics object having a defined radius and position in space is within the field of view of the observer.

12. The method of claim 10, further comprising the step of determining whether a first graphics object having a defined radius and position in space is obscured by a closer graphics object to the observer, wherein said closer graphics object has a defined opaque radius and position, and said first graphics object has a defined radius and position.

13. A system for rendering data in a graphical computer, comprising:

a client configured to receive a pruned set of objects and to render data from said pruned set of objects in order to form a graphical representation of said pruned set of objects;

a server configured to store data as a hierarchical list of objects and to transmit said pruned set of objects to said client, said hierarchical list forming a tree structure having parent objects that are associated with children objects, wherein each of said parent objects is respectively associated with other objects that are within a scene displaying said parent object;

pruning means within said server for selecting said pruned set of objects based on a hierarchical position within said tree structure of each object of said pruned set of objects; and culling means for eliminating data associated with said pruned set of objects.

14. The system of claim 13 wherein said pruning means is configured to select each child object associated with a particular object, each parent object associated with said particular object, and each sibling object associated with each said parent object.

15. The system of claim 13 wherein said pruning means is further configured to eliminate objects which are outside of an observer view cone.

16. The system of claim 13 wherein said hierarchical list is a linked list.

17. The system of claim 16 wherein said pruning means is further configured to eliminate objects based on a distance of an object from an observer.

* * * * *

UNITED STATES PATENT AND TRADEMARK OFFICE
CERTIFICATE OF CORRECTION

PATENT NO. : 5,945,992
DATED : August 31, 1999
INVENTOR(S) : Ross Cunniff

It is certified that error appears in the above-identified patent and that said Letters Patent is hereby corrected as shown below:

Column 7,
Line 53, delete "if (?rejected) {" and insert therefor -- "if (!rejected){ --

Column 9,
Line 61, after "*level-of-detail" insert as a new line -- */ --

Column 12,
Line 11, before "culling means" insert -- (b) --

Signed and Sealed this

Twenty-first Day of January, 2003

JAMES E. ROGAN
*Director of the United States Patent and Trademark Office*